US010423024B2

United States Patent
Li

(10) Patent No.: US 10,423,024 B2
(45) Date of Patent: Sep. 24, 2019

(54) DISPLAY DEVICE AND FABRICATING METHOD THEREOF

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 15/578,584

(22) PCT Filed: May 31, 2017

(86) PCT No.: PCT/CN2017/086540
§ 371 (c)(1),
(2) Date: Nov. 30, 2017

(87) PCT Pub. No.: WO2018/019027
PCT Pub. Date: Feb. 1, 2018

(65) Prior Publication Data
US 2018/0348552 A1 Dec. 6, 2018

(30) Foreign Application Priority Data

Jul. 29, 2016 (CN) .......................... 2016 1 0616580
Jul. 29, 2016 (CN) .......................... 2016 1 0618088

(51) Int. Cl.
*G02F 1/1334* (2006.01)
*G02F 1/1343* (2006.01)
(Continued)

(52) U.S. Cl.
CPC .......... *G02F 1/1334* (2013.01); *C09K 19/542* (2013.01); *G02F 1/137* (2013.01);
(Continued)

(58) Field of Classification Search
CPC ............. H01L 2924/06; H01L 51/5268; H01L 51/5203; H01L 2933/0016; H01L 33/18;
(Continued)

(56) References Cited

U.S. PATENT DOCUMENTS 5,680,188 A 10/1997 Yoshida et al.
6,118,420 A 9/2000 Yamamoto et al.
(Continued)

FOREIGN PATENT DOCUMENTS

CN 1098203 A 2/1995
CN 102155674 A 8/2011
(Continued)

OTHER PUBLICATIONS

International Search Report & Written Opinion dated Aug. 25, 2017, regarding PCT/CN2017/086540.

*Primary Examiner* — Thoi V Duong
(74) *Attorney, Agent, or Firm* — Intellectual Valley Law, P.C.

(57) ABSTRACT

Display device and fabrication method thereof are provided. A display includes a polymer liquid crystal cell, including a first electrode layer, a second electrode layer, and a light-scattering adjustment layer between the first electrode layer and the second electrode layer; and a light source, arranged on a first side of the polymer liquid crystal cell and configured to emit light into the light-scattering adjustment layer. The first electrode layer includes at least one first electrode. The second electrode layer includes at least one second electrode. The display region of the polymer liquid crystal cell includes a plurality of regions having a light-scattering ability increase along a direction away from the light source.

16 Claims, 3 Drawing Sheets

(51) Int. Cl.
*G02F 1/1335* (2006.01)
*C09K 19/54* (2006.01)
*G02F 1/137* (2006.01)

(52) U.S. Cl.
CPC .. *G02F 1/133553* (2013.01); *G02F 1/133615*
(2013.01); *G02F 1/134309* (2013.01); *C09K 2019/548* (2013.01); *G02F 2001/13775* (2013.01); *G02F 2201/121* (2013.01); *G02F 2201/122* (2013.01); *G02F 2201/123* (2013.01)

(58) Field of Classification Search
CPC ............. G02F 1/134309; G02F 1/1334; G02F 1/1335; G02F 1/133553; G02F 1/133615; G02F 1/133603; G02F 1/1333; G02F 1/133606; G02F 1/133611; G02F 1/1343; G02F 1/134336; G02F 1/137; G02F 2001/134318; G02F 2001/13756; G02F 2001/13775; G02F 2202/022; G02F 2201/121; G02F 2201/122; G02F 2201/123; G09G 3/36; G09G 3/18; G09G 2300/0426; G02B 6/0028; C09K 19/542
See application file for complete search history.

(56) References Cited

U.S. PATENT DOCUMENTS

| | | |
|---|---|---|
| 2011/0141551 A1 | 6/2011 | Uchida et al. |
| 2015/0055055 A1 | 2/2015 | Ebisui et al. |
| 2015/0116636 A1 | 4/2015 | Chen et al. |
| 2016/0163271 A1* | 6/2016 | Sakaigawa ............ G02F 1/1326 345/694 |

FOREIGN PATENT DOCUMENTS

| | | |
|---|---|---|
| CN | 103293744 A | 9/2013 |
| CN | 103717961 A | 4/2014 |
| CN | 102628579 B | 5/2016 |
| CN | 106019674 A | 10/2016 |
| CN | 106019675 A | 10/2016 |
| CN | 106094338 A | 11/2016 |
| CN | 205844682 U | 12/2016 |
| CN | 206074957 U | 4/2017 |

* cited by examiner

DISPLAY DEVICE AND FABRICATING METHOD THEREOF

CROSS-REFERENCE TO RELATED APPLICATION

This application is a national stage application under 35 U.S.C. § 371 of International Application No. PCT/CN2017/086540, filed May 31, 2017, which claims the priority of Chinese Patent Application No. 201610616580.6, filed on Jul. 29, 2016 and Chinese Patent Application No. 201610618088.2, filed Jul. 29, 2016. Each of the forgoing applications is herein incorporated by reference in its entirety for all purposes.

TECHNICAL FIELD

The present disclosure generally relates to the field of display technology, and more particularly, relates to a display device and a fabricating method thereof.

BACKGROUND

As display technology advances, transparent display products have newly emerged. When a transparent display device is in operation, the user can clearly see scenes behind the transparent display device through the transparent display device. Because of this, the transparent display device has become more popular and has been gradually involved in store windows, smart glasses, smart helmet, and other products.

The transparent display device may include a transparent polymer liquid crystal cell (i.e., a transparent optical waveguide display assembly), which may provide higher light transmittance and better display than other transparent display devices.

However, the display assembly of the transparent polymer liquid crystal cell may have poor display uniformity due to the attenuation effect of the polymer liquid crystal cell of the display device.

Accordingly, the disclosed display device and fabricating method thereof are directed to solve one or more problems set forth above and other problems.

SUMMARY

In accordance with some embodiments of the present disclosure, a display device and a fabricating method thereof are provided.

One aspect of the present disclosure provides a display device. The display device includes a polymer liquid crystal cell, including a first electrode layer, a second electrode layer, and a light-scattering adjustment layer between the first electrode layer and the second electrode layer; and a light source, arranged on a first side of the polymer liquid crystal cell and configured to emit light into the light-scattering adjustment layer. The first electrode layer includes at least one first electrode. The second electrode layer includes at least one second electrode. The display region of the polymer liquid crystal cell includes a plurality of regions having a light-scattering ability increase along a direction away from the light source.

Optionally, the first electrode layer includes a plurality of first electrodes, arranged along the direction away from the light source with adjacent first electrodes spaced apart from one another.

Optionally, the second electrode layer includes a plurality of second electrodes; and the plurality of second electrodes are block-shaped electrodes and arranged into an array.

Optionally, the first electrode corresponds to at least one second electrode.

Optionally, the plurality of first electrodes are common electrodes; and the plurality of second electrodes are pixel electrodes.

Optionally, the plurality of regions of the polymer liquid crystal cell have a substantially identical size; and each region includes at least one first electrode.

Optionally, the plurality of first electrodes are made of a same material.

Optionally, an area of the first electrode gradually increases along the direction away from the light source.

Optionally, each first electrode has a rectangular shape; a length of the first electrode remains constant; and a width of the first electrode gradually increases along the direction away from the light source.

Optionally, the plurality of first electrodes have substantially identical dimensions; a plurality of hollow holes are formed in each first electrode; and a total area of the hollow holes in the first electrode gradually decreases along the direction away from the light source.

Optionally, the plurality of hollow holes are substantially evenly distributed and have a substantially same shape.

Optionally, each region of the polymer liquid crystal cell includes a plurality of pixels; and each hollow hole has an area less than an area of a single pixel.

Optionally, each region of the polymer liquid crystal cell includes a plurality of pixels; and a number of the hollow holes in each region of the polymer liquid crystal cell is less than 10% of a number of pixels in the region.

Optionally, the light-scattering adjustment layer is made of polymer-stabilized liquid crystals (PSLCs), formed from a macromolecular polymer and liquid crystals.

Optionally, along the direction away from the light source, a concentration of macromolecular polymer in the region of the polymer liquid crystal cell gradually increases.

Optionally, the macromolecular polymer includes at least one of:

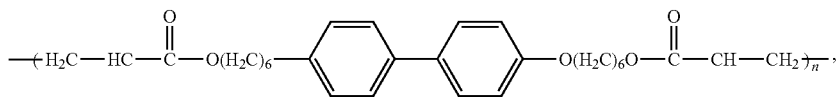

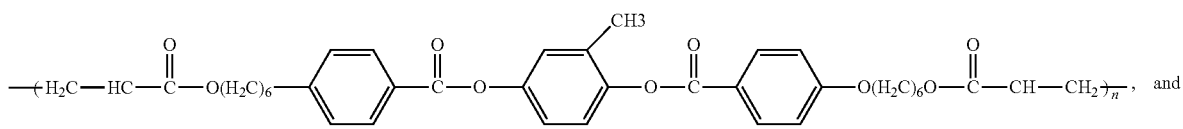

and

-continued

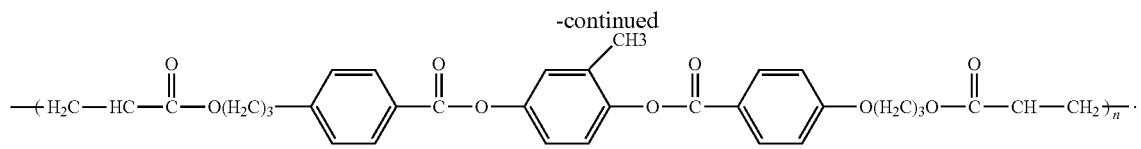

Optionally, the display device further includes a reflector on a second side of the polymer liquid crystal cell that is opposite to the light source.

Another aspect of the present disclosure provides a method for fabricating a display device by forming a polymer liquid crystal cell, including providing a first substrate and a second substrate, and forming a light-scattering adjustment layer between the first substrate and the second substrate using liquid crystals and a macromolecular polymer. The polymer liquid crystal cell includes a plurality regions arranged along a direction away from a light source, and the concentration of the macromolecular polymer in the region of the polymer liquid crystal cell gradually increases along the direction away from the light source.

In some embodiments, forming the light-scattering adjustment layer includes forming a mixture including a liquid crystal material and a plurality of monomers and irradiating the mixture using ultraviolet light, such that the plurality of monomers dispersed in the liquid crystal material undergoes a polymerization reaction to form the macromolecular polymer. By controlling a reaction parameter of the polymerization reaction, including at least one of a polymerization temperature, an irradiating time, and an irradiating intensity, the concentration of the macromolecular polymer in the region of the light-scattering adjustment layer increases along the direction away from the light source.

In some embodiments, forming the light-scattering adjustment layer further includes forming a plurality of cavities between the first substrate and the second substrate, and filling mixtures of a liquid crystal material and a plurality of monomers into each of the plurality of cavities respectively such that one of the plurality of cavities has a larger distance from the light source is filled with a mixture having a higher concentration of the monomers.

Other aspects of the present disclosure can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference input now be made in detail to exemplary embodiments of the invention, which are illustrated in the accompanying drawings in order to understand and implement the present disclosure and to realize the technical effect. It should be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

Figure 1:
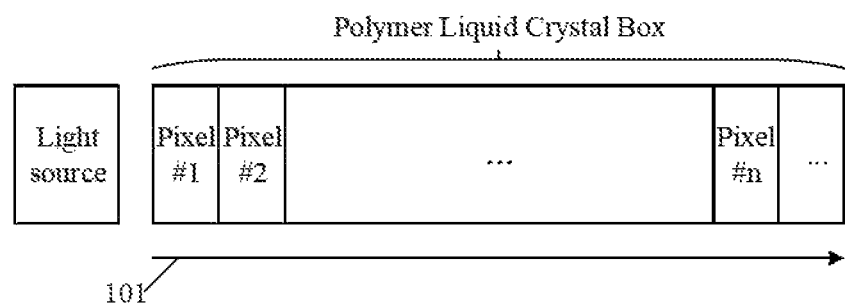
FIG. 1 illustrates a schematic structural diagram of a display device in accordance with some embodiments of the present disclosure.

FIG. 1 illustrates a schematic structural view of a display device. Referring to FIG. 1, the display device may include a polymer liquid crystal cell and a light source. The polymer liquid crystal cell may further include a first electrode layer, a second electrode layer, and a light-scattering adjustment layer between the first electrode layer and the second electrode layer. The light source may be arranged on a first side of the polymer liquid crystal cell and may be configured to emit light into the light-scattering adjustment layer. Moreover, the first electrode layer may include at least one first electrode, the second electrode layer may include at least one second electrode, and the polymer liquid crystal cell may include a plurality of regions along the transmission direction of the light beams in the polymer liquid crystal cell. A light-scattering ability of the region of the polymer liquid crystal cell increases along the direction away from the light source.

When receiving an electric signal, the light-scattering adjustment layer may be in a scattering state, which damages the total reflection conditions of the light. In this case, the light can be transmitted to exit the polymer liquid crystal cell. In other cases, when the light-scattering adjusting layer is in a transmitting state, the light may undergo a total reflection within the polymer liquid crystal cell and cannot exit the polymer liquid crystal cell.

As shown in FIG. 1, due to the light attenuation in the polymer liquid crystal cell, as the distance from a pixel to the light source become farther, the intensity of the pristine indecent light on the pixel becomes lower. Therefore, even an identical electrical signal is applied to different pixels in the polymer liquid crystal cell, the brightness of the pixels can still be different. That is, the display device may have poor uniformity of the display effect.

To improve the display uniformity, the present disclosure provides a display device and a fabricating method thereof. According to the disclosed display device, the light-scattering ability of the polymer liquid crystal cell of the display device can be designed according to distances from different portions of the polymer liquid crystal cell to the light source. A portion of the polymer liquid crystal cell has a larger distance from the light source area, the portion of the polymer liquid crystal cell may demonstrate a stronger light-scattering ability. That is, the angle of the incident light may be more easily changed, and thus the total reflection condition may be more easily destroyed. As such, the uneven display problem caused by the light attenuation can be compensated to improve the display uniform performance of the display device.

The polymer liquid crystal cell of the disclosed display device may include a display region. The display region of the display device may further include a first portion and a second portion with a substantially same area. Moreover, the first portion is closer to a light source as compared to the second portion. When an identical electrical signal is applied on the pixels of the display device, the second portion of the display region may demonstrate a stronger light-scattering ability than the first portion of the display region. That is, the incident light in the second portion of the display region may be more easily scattered than the incident light in the first portion of the display region. Accordingly, the incident light in the second portion of the display region may result in a bright state more easily than the incident light in the first portion of the display region.

In one embodiment, the display device may include a polymer liquid crystal cell and alight source. The light source may be arranged on a first side of the polymer liquid crystal cell and configured to emit light into a light-scattering adjustment layer of the polymer liquid crystal cell. The polymer liquid crystal cell may further include a first electrode layer and a second electrode layer. The light-scattering adjustment layer may be between the first electrode layer and the second electrode layer. The first electrode layer may include at least one first electrode, and the second electrode layer may include at least one second electrode.

The polymer liquid crystal cell may also include a plurality of pixels in the display region. Each pixel may include a pixel electrode and a common electrode. The first electrode may be one of the pixel electrode and the common electrode, while the second electrode may be the other of the pixel electrode and the common electrode.

In some embodiments, the at least one first electrodes of the first electrode layer may be arranged along the direction away from the light source with adjacent first electrodes spaced apart from one another. The at least one second electrode of the second electrode layer may be block-shaped electrodes and arranged into an array.

In some embodiments, the first electrode may correspond to at least one second electrode. The first electrodes may be common electrodes and the second electrodes may be pixel electrodes.

Figure 2:
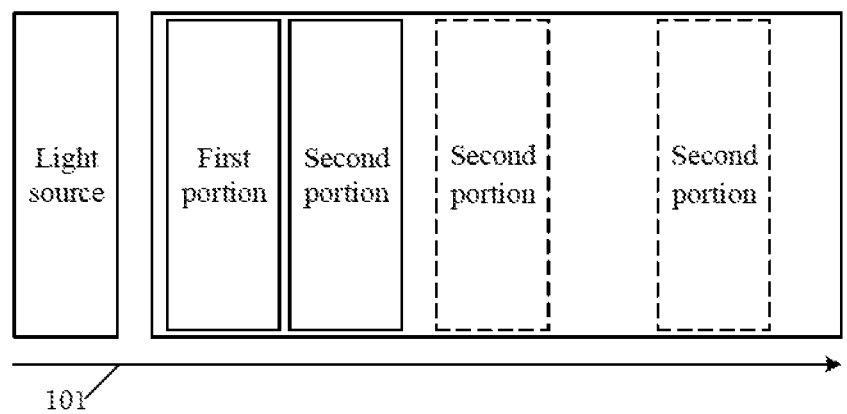
FIG. 2 illustrates a schematic diagram of different portions of an exemplary display device in accordance with some embodiments of the present disclosure.

FIG. 2 illustrates a schematic diagram of different portions of an exemplary display device in accordance with some embodiments of the present disclosure.

Referring to FIG. 2, the plurality of regions of the display region may include a first portion and a second portion, used to illustrate regions having different distances from the light source. For example, the second portion may be any portion located at different positions in the display region with respect to the first portion, as long as a second distance from the second portion to the light source is greater than a first distance from the first portion to the light source. That is, the first portion and the second portion can be located arbitrarily on any positions of the display device, as long as the first portion is located between the light source and the second portion.

In some embodiments, the first portion and the second portion can have a substantially same area. A light-scattering ability of the first portion is weaker than a light-scattering ability of the second portion when the voltages of the electrical signals applied to the pixel electrodes in the first portion and the second portion are equal. As shown in FIG. 2, the first portion in the display device can be close to the light source. The second portion in the display device can be distant from the light source.

Accordingly, the light-scattering ability of the polymer liquid crystal cell can be designed according to distances from different portions of the polymer liquid crystal cell to the light source. A portion of the polymer liquid crystal cell has a larger distance from the light source area, the portion of the polymer liquid crystal cell may demonstrate a stronger light-scattering ability. That is, the angle of the incident light may be more easily changed, and thus the total reflection condition may be more easily destroyed. As such, the uneven display problem caused by the light attenuation can be compensated to improve the display uniform performance of the display device.

According to the existing technology, methods to ensure display uniformity are usually proposed from a signal design standpoint and realized through compensation of electrical signals. The disclosed display device is designed to improve the uniformity of the display device from a polymer liquid crystal cell standpoint. That is, by properly designing the polymer liquid crystal cell, the display uniformity of the display device may be improved.

The disclosed display device can be implemented by various embodiments, which are described in detail in the following.

In some embodiments, the disclosed display device may include a plurality of control electrodes in the display region of the polymer liquid crystal cell. In one embodiment, the plurality control electrodes may include the first electrodes and/or the second electrodes. The area of each control electrode may be designed based on the distance from the control electrode to a light source to ensure that a portion of display region with a larger distance from the light source demonstrates a stronger light-scattering ability as compared to a portion of the display region with a smaller distance from the light source. The control electrodes may include the common electrodes and/or the pixel electrodes of the display device. That is, the first electrodes and the second electrodes may correspond to the common electrodes and the pixel electrodes, respectively.

Retelling back to FIG. 1, an electric field can be applied to the control electrodes, including a common electrode and a pixel electrodes, to form an electric field acting on the light-scattering adjustment layer. The state of the light-scattering adjustment layer can be changed by the electric field. Therefore, the larger area affected by the electric field, the more liquid crystal molecules in the area can be switched to another state, resulting in a stronger ability to scatter the indecent light.

Thus, the area of a control electrode can be adjusted based on the first distance from the first portion (referring to FIG.

2) to the light source and the second distance from the second portion (referring to FIG. 2) to the light source. The portion that is not covered by the control electrode cannot generate an electric field to affect the corresponding light-scattering adjustment layer, so that the light-scattering adjustment layer of the portion does not participate in the scattering of the incident light, thereby reducing the light-scattering ability.

As long as a portion of display region with a larger distance from the light source is ensured to demonstrate a stronger light-scattering ability than a portion of display region with a smaller distance from the light source, the control electrodes having different areas may be the pixel electrodes and/or the common electrodes of the display device. In view of the convenience of implementation and the impact on the pixel display, in some embodiments, the common electrodes may be adjusted and the pixel electrodes may remain the same. In other embodiments, the pixel electrodes may be adjusted and the common electrodes may remain the same, or the common electrodes and the pixel electrodes may both be adjusted. Moreover, in some embodiments, as long as it is ensured that a region having a larger distance from the light source demonstrates a stronger light-scattering ability, the control electrodes having different areas may be the common electrodes in a portion of the display region, and the pixel electrodes in another portion of the display region.

The first portion close to the light source needs a relatively weak light-scattering ability because the first portion has more incident light. The second portion distant away from the light source needs a relatively strong light-scattering ability because the second portion has less incident light.

When an identical electrical signal is applied, a common electrode has a larger area can affect a larger area of the light-scattering adjustment layer, so that the corresponding light-scattering adjustment layer can have a stronger light-scattering ability. A common electrode has a smaller area can affix a smaller area of the light-scattering adjustment layer, so that the corresponding light-scattering adjustment layer can have a weaker light-scattering ability.

Therefore, in some embodiments, an area of the common electrode in the first portion close to the light source can be smaller than an area of the common electrode in the second portion distant from the light source. As such, when the voltage of the electrical signals applied to the pixel electrodes in different portions are the same, the light-scattering ability of the first portion in the display device can be weaker than the light-scattering ability of the second portion in the display device.

It should be noted that, in some specific embodiments, in order to achieve optimal improvement of the display uniformity, a part of the display region can be compensated by using the above described method. In some alternative embodiments, the whole display region can be compensated by using the above described method, to improve the display uniformity.

In some embodiments, the plurality of regions of the polymer liquid crystal cell may have a substantially identical size. Each region may include at least one first electrode. In some embodiments, the plurality of first electrodes may be made of a same material. An area of the first electrode may gradually increase along the direction away from the light source. Each first electrode may have a rectangular shape. A length of the first electrode may remain constant. A width of the first electrode may gradually increase along the direction away from the light source.

Figure 3:
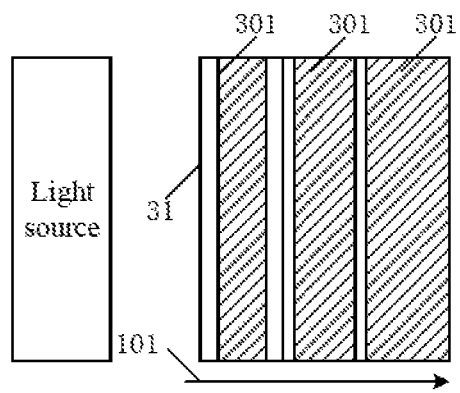
FIG. 3 illustrates a schematic diagram of an exemplary arrangement of electrodes of a display device in accordance with some embodiments of the present disclosure.

For example, FIG. 3 illustrates a schematic diagram of an exemplary arrangement of the electrodes of a display device in accordance with some embodiments of the present disclosure.

As shown FIG. 3, the display region in the display device can have a rectangular shape. The rectangular display region can include a first side 31 adjacent to the light source. The rectangular display region can be divided into a plurality of regions 301, which are sequentially or continuously distributed in a direction 101 perpendicular to the first side 31 and parallel to the display region. As shown in FIG. 3, three regions 301 are shown as an example, although any number regions, more or less than three, can be included in the present disclosure. In some embodiments, each region 301 may include at least one pixel. The pixel may include a common electrode and a pixel electrode.

In any two adjacent regions 301, an area of the common electrode (having slashes as shown in FIG. 3) in the region close to the first side 31 can be smaller than an area of the common electrode in the region distant from the first side 31. The areas of all pixel electrodes in the display region can be the same.

As shown in FIG. 3, in the direction 101 from the left to the right, the distance away from the light source can become farther, and the corresponding common electrode can have a larger area. Further, the incident light in each region can become weaker. Although the pixel electrodes in each region can have a substantially same area the corresponding common electrodes can have increasing areas in the direction 101 from the left to the right. Therefore, under the same electrical signal, the light-scattering ability of the light-scattering adjustment layer can become stronger. As such, when the incident light in each region becomes weaker, the display device can still ensure a relatively, stably emitted light.

In some embodiments as shown in FIG. 3, each region can have a respective common electrode. In some other embodiments, a common electrode can be used for a whole area.

In some embodiments, the plurality of first electrodes may have substantially identical dimensions. Hollow holes may be formed in each first electrode. A total area of the hollow holes in the first electrode may gradually decrease along the direction away from the light source. In one embodiment, the hollow holes are substantially evenly distributed and may have a substantially same shape. Each region of the polymer liquid crystal cell may include a plurality of pixels. Each hollow hole may have an area less than an area of a single pixel in each region of the display region. In one embodiment, a number of the hollow holes in each region of the polymer liquid crystal cell may be less than 10% of a number of pixels in the region.

Figure 4:
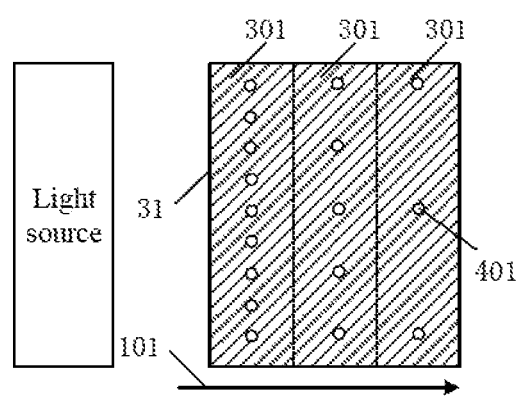
FIG. 4 illustrates a schematic diagram of another exemplary arrangement of electrodes of a display device in accordance with some embodiments of the present disclosure.

For example, FIG. 4 illustrates a schematic diagram of another exemplary arrangement of electrodes of a display device in accordance with some embodiments of the present disclosure.

Referring to FIG. 4, the plurality of regions 301 may have a same size, and the corresponding electrodes, such as a control electrode, may also have identical dimensions. For example, the control electrode may be a common electrode (or a pixel electrode in another example) included in the region 301 and may include a plurality of hollow holes 401. The hollow holes 401 may be distributed over the control electrodes of different regions 301, for example, along a direction 101 shown in FIG. 4. In any two adjacent regions 301, a total area of the hollow holes 401 in the region close to the first side 31 can be larger than a total area of the hollow holes 401 in the region distant from the first side 31.

In some specific embodiments, the plurality of hollow holes 401 may have different cross-sectional shapes. In some other specific embodiments, the plurality of hollow holes 401 can have a same cross-sectional shape in order to facilitate the production, and also to avoid an excessive concentration of the hollow holes 401. In each region, the hollow holes 401 can be evenly distributed.

In order to further reduce the influence on the display, in some embodiments, each of the plurality of hollow holes 401 has an area less than an area of a single pixel, and a number of the hollow holes 401 in each region 301 can be less than 10% of the number of pixels in the region.

That is, using the design described above, it can be ensured that each pixel corresponds to at least a common electrode.

In some alternative embodiments, the disclosed display device may include a light-scattering adjustment layer including a macromolecular polymer and liquid crystal particles distributed in the macromolecular polymer. The concentration of the macromolecular polymer may be designed based on the distance from the control electrode to a light source to ensure that a portion of display region with a larger distance from the light source demonstrates a stronger light-scattering, ability as compared to a portion of the display region with a smaller distance from the light source.

Referring back to FIG. 1, an electric field can be applied to the common electrode and the pixel electrode to form an electric field acting on the light-scattering adjustment layer. The states of a plurality of liquid crystal molecules in the light-scattering adjustment layer can be changed by the electric field. Therefore, the more liquid crystal molecules in the area can be switched to another state, a stronger ability to scatter the indecent light can be achieved.

As described above, the display device can include a transparent polymer liquid crystal cell, including a first substrate, a second substrate, and a light-scattering adjustment layer between the first substrate and the second substrate.

In the display device, the light-scattering adjustment layer is the component that can affect the light. The light-scattering adjustment layer can include a macromolecular polymer and liquid crystal particles distributed in the macromolecular polymer. Under an action of an electric field, the refractive index of the liquid crystal particles and the refractive index of the macromolecular polymer can be different. If no electric field is applied, the refractive index of the liquid crystal particles and the refractive index of the macromolecular polymer can be the same or similar.

In some embodiments, a material of the light-scattering adjustment layer is a macromolecular polymer-stabilized liquid crystal (PSLC).

In some other embodiments, a material of the light-scattering adjustment layer includes a nematic liquid crystal, and a long chain compound dispersed in the nematic liquid crystal. The long chain compound can be used for forming the liquid crystal in a scattering state. The long chains of the long chain compound can be perpendicular to the display region described above.

The long chain compound can include a plurality of monomers. The monomers can include any one or a combination of the following:

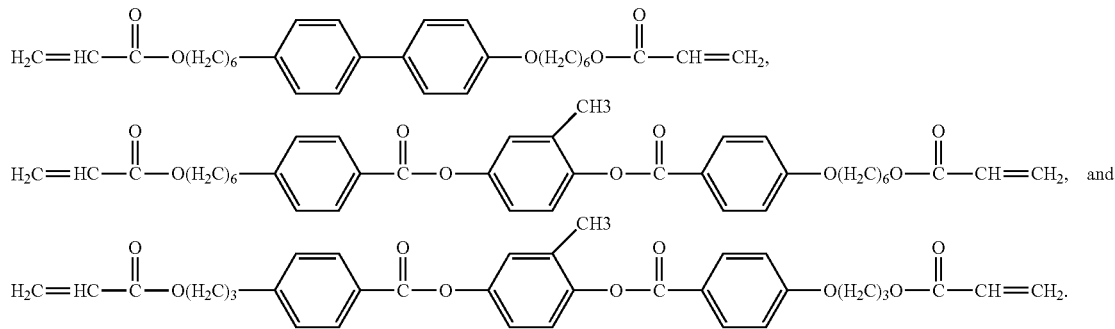

The long chain compound can include any one or a combination of the following:

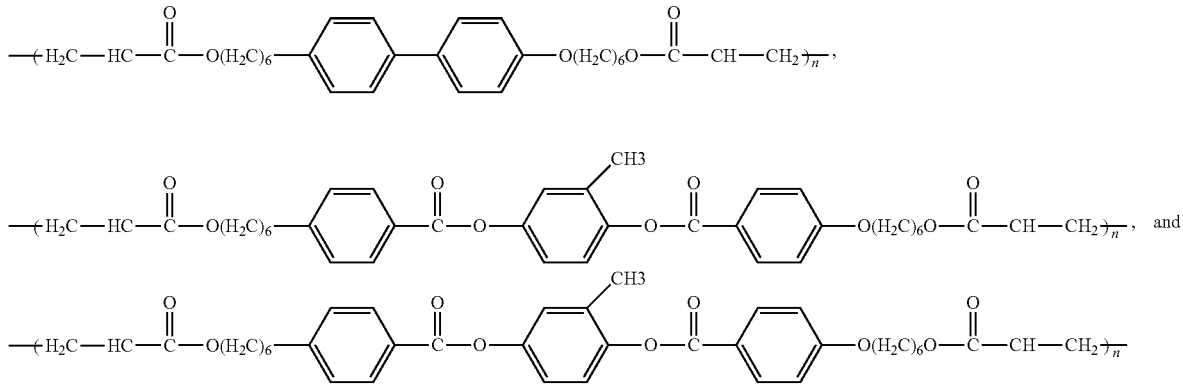

The nematic liquid crystal can include any one or a combination of the following liquid crystal molecules:

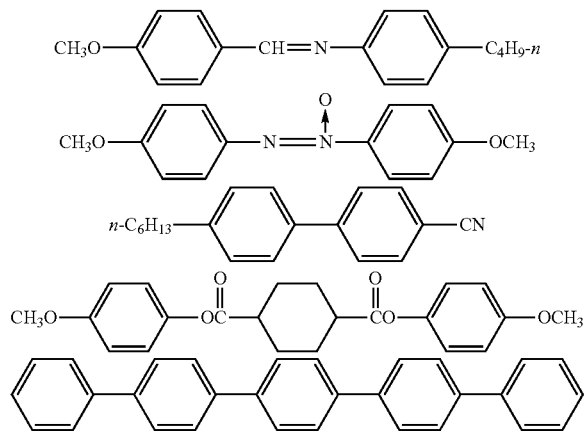

The constitution of the light-scattering adjustment layer described above is not limited according to various embodiments of the present disclosure.

During a process for forming the light-scattering adjustment layer, the monomers and the liquid crystal can be mixed and then irradiated under an ultraviolet lamp. The monomers can be linked with each other to form a macromolecular polymer. At the same time when forming the macromolecular polymer, the liquid crystal can be separated from the macromolecular polymer to form a plurality of small liquid crystal particles. These small liquid crystal particles can be fixed in place by the macromolecular polymer.

When an electric field is applied, the liquid crystal can be disordered by the influence of the macron molecular polymer. The difference between the refractive index of the macromolecular polymer and the refractive index of the liquid crystal can be formed. As such, the incident light can be refracted and reflected at the surfaces of the liquid crystal particles. For a part of the incident light, the total reflection condition can thus be destroyed. Therefore, after several reflections and refractions, the part of the incident light may be transmitted to exit the light-scattering adjustment layer, resulting in a bright state.

When there is no electric field applied, the liquid crystal and the macromolecular polymer can have a same refractive index. Thus, the liquid crystal and the macromolecular polymer are transparent to incident light. As such, the total reflection condition of the incident light can be maintained. Therefore, the incident light can be constrained in the polymer liquid crystal cell, and cannot exit from the light-scattering adjustment layer.

It should be noted that, when uniform electrodes are designed, that is, when each electrode has an exactly same design regardless of the region, and when the applied electrical signals are the same, the light-scattering ability of each region of the polymer liquid crystal cell can depend on the concentration of the macromolecular polymer in the corresponding region.

If one region has a higher concentration of the macromolecular polymer, the macromolecular polymer can have a stronger ability to affect the orientation of the liquid crystal. Therefore, the quantity of the affected liquid crystal particles can be larger, and the light traveling in the region can experience more reflection and refraction, leading to more light exiting from the polymer liquid crystal cell.

In some embodiments, the concentration of the macromolecular polymer in the first portion in the display device can be lower than the concentration of the macromolecular polymer in the second portion in the display device.

Since the first portion has a lower concentration of the macromolecular polymer, it can affect less number of liquid crystal particles. As such, when the voltages of the electrical signals applied to the pixel electrodes are same, the light-scattering ability of the first portion in the display device can be weaker than the light-scattering ability of the second portion in the display device.

Accordingly, in some embodiments, the disclosed display device can have a display region including a first portion and a second portion. The first portion in the display device can be close to the light source. The second portion in the display device can be distant from the light source. The first portion and the second portion can have a substantially same area. The concentration of the macromolecular polymer in the first portion in the display device can be lower than the concentration of the macromolecular polymer in the second portion in the display device.

A concentration of a substance can be characterized by an amount of substance per unit volume. Specifically to the macromolecular polymer, the concentration can be expressed as a number of macromolecular polymer chains per unit volume.

In some specific embodiments, in order to achieve optimal improvement of the display uniformity, a part of the display region can be compensated. In some alternative embodiments, the whole display region can be compensated to improve the display uniformity.

Figure 5:
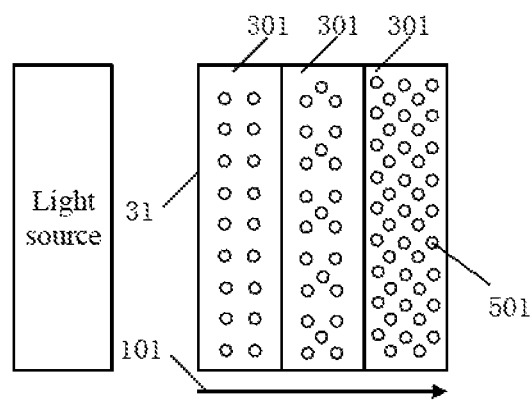
FIG. 5 illustrates a schematic diagram of an exemplary concentration relationship of a macromolecular polymer in different regions of a polymer liquid crystal cell of a display device in accordance with some embodiments of the present disclosure.

Referring to FIG. 5, a schematic diagram of an exemplary concentration relationship of a macromolecular polymer in different regions of a display device is shown in accordance with some embodiments of the present disclosure.

As illustrated, the display region in the display device can have a rectangular shape. The rectangular display region can include a first side 31 adjacent to the light source. The rectangular display region can be divided into a plurality of regions 301 which are continuously distributed in a direction 101 perpendicular to the first side 31 and parallel to the display region. As shown in FIG. 5, three regions 301 are shown as an example, although any number regions, more or less than three, can be included in the present disclosure.

In any two adjacent regions 301, a concentration of the macromolecular polymer 501 in the region close to the first side 31 can be smaller than concentration of the macromolecular polymer 501 in the region distant from the first side 31.

As shown in FIG. 5, in the direction 101 from the left to the right, the distance away from the light source can become larger, and the corresponding region can have a larger amount of macromolecular polymer 501. That is, the concentration of the macromolecular polymer 501 in each region can become higher. Further, the incident light in each region can become weaker.

However, under the same electrical signals, since the concentration of the macromolecular polymer 501 in each region can become higher, the ability to affect the liquid crystal particles under the same electrical signal can become stronger. As such, in the direction 101 from the left to the right and away from the light source, the number of the affected livid crystal particles can become more, so that the light-scattering ability of the light-scattering adjustment layer can become stronger. Therefore, when the incident light in each region becomes weaker, the display device can still ensure relatively stable light emission.

In some embodiments, in order to improve light utilization efficiency and to increase the display brightness, the display device can further include a reflector (not shown) on a second side of the polymer liquid crystal cell. That is, the reflector and the light source are located separately on the two sides of the polymer liquid crystal cell.

By using the reflector, the light emitted from the polymer liquid crystal cell can be re-reflected back into the polymer liquid crystal cell. Thus, the utilization ratio of the light can be improved, and the display brightness can be increased.

In some embodiments, in order to improve the display uniformity of the display device, when the voltage of the electric signal applied to the pixel electrodes are same, a difference between a first total luminance of the pixels corresponding to the first portion in the display device and a second total luminance of the pixels corresponding to the second portion in the display device can be less than a predetermined threshold. For example, the first portion and the second portion may have a maximum luminance substantially the same.

As mentioned above, in some embodiments, the display uniformity of the display device can be improved by changing the concentration of the macromolecular polymer 501.

Figure 6:
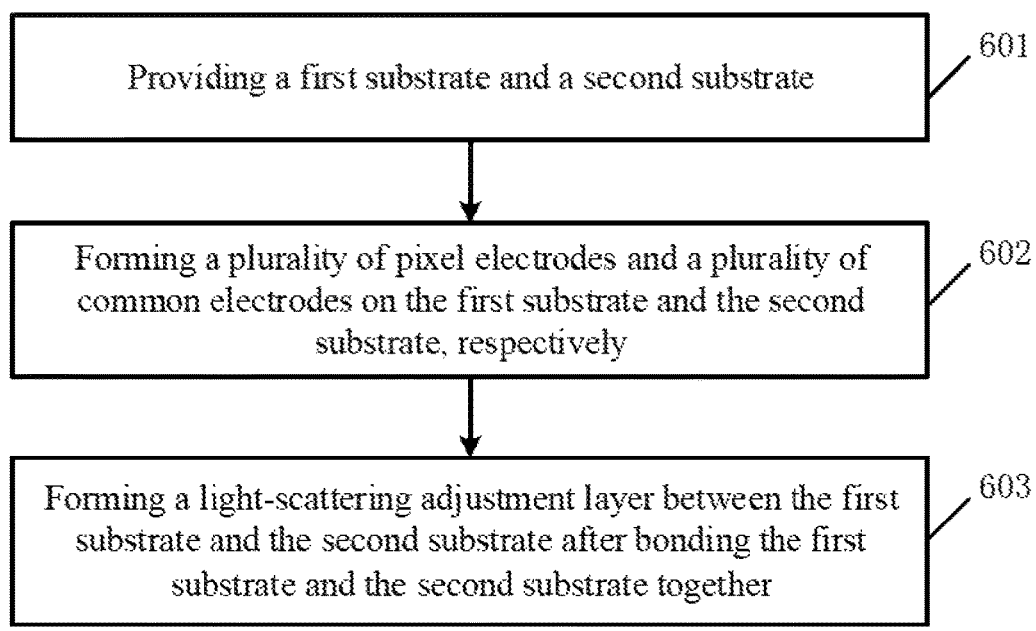
FIG. 6 illustrates a schematic flow diagram of an exemplary process for fabricating a polymer liquid crystal cell of a display device in accordance with some embodiments of the present disclosure.

The present disclosure also provides a method for fabricating a polymer liquid crystal cell of a display device. FIG. 6 shows a schematic flowchart of an exemplary process for fabricating, a polymer liquid crystal cell of a display device in accordance with some embodiments of the present disclosure.

Referring to FIG. 6, the process for fabricating a polymer liquid crystal cell may include the following steps.

At step 601, a first substrate and a second substrate can be provided.

At step 602, a pixel electrode and a common electrode can be formed on the first substrate and the second substrate respectively.

At step 603, a light-scattering adjustment layer can be formed between the first substrate and the second substrate.

In some embodiments, the formed polymer liquid crystal cell can have a display region including a first portion and a second portion. The first portion in the display device can be close to the light source. The second portion in the display device can be distant from the light source. The first portion and the second portion can have a substantially same area. The concentration of the macromolecular polymer in the first portion in the display device can be lower than the concentration of the macromolecular polymer in the second portion in the display device.

In some embodiments, the concentration of the macromolecular polymer can be controlled by using different mixtures of the liquid crystal and the monomers for different regions. For example, a plurality of cavities can be formed in the polymer liquid crystal cell, and each cavity can be filled with different mixtures of the liquid crystal and the monomers. A cavity has a larger distance from the light source can be filled with a mixture having a higher concentration of the monomer(s).

Further, the mixtures can be irradiated by ultraviolet light uniformly, such that the monomer distributed in the liquid crystal can have a polymerization reaction to form the macromolecular polymer.

In some alternative embodiments, the concentration of the finally formed macromolecular polymer in different regions can be controlled according to the distances from the different regions to the light source. The concentration of the macromolecular polymer can be controlled by the reaction parameters during the polymerization reaction. Therefore, without preparing a unique mixture of liquid crystal and monomer for each region, the production difficulty can be greatly reduced.

In some embodiments, a process for forming the light-scattering adjustment layer between the first substrate and the second substrate can include forming a mixture of a liquid crystal and a plurality of monomers, and using ultraviolet light to irradiate the mixture, such that the monomer distributed in the liquid crystal can have a polymerization reaction to form a macromolecular polymer.

By controlling a reaction parameter of the polymerization reaction, the concentration of the macromolecular polymer in the first portion in the light-scattering adjustment layer can be lower than the concentration of the macromolecular polymer in the second portion in the light-scattering adjustment layer.

The reaction parameter of the polymerization reaction can be at least one of a polymerization temperature, an irradiating time, and an irradiating intensity. For example, the polymerization temperature of the first portion can be lower than the polymerization temperature of the second portion. As another example, the irradiating time of the first portion can be shorter than the irradiating time of the second portion. As yet another example, the irradiating intensity of the first portion can be weaker than the irradiating intensity of the second portion.

In some embodiments, in the polymerization step, an ultraviolet light having an even intensity can be used to expose and irradiate to the entire light-scattering adjustment layer. The irradiating time of the first portion of the light-scattering adjustment layer can be shorter than the irradiating time of the second portion of the light-scattering adjustment layer.

In some alternative embodiments, in the polymerization step, a same irradiating time can be applied to the entire light-scattering adjustment layer. The ultraviolet intensity for irradiating the first portion of the light-scattering adjustment layer can be weaker than the ultraviolet intensity for irradiating the second portion of the light-scattering adjustment layer.

Since only one mixture is required to be generated, the irradiating time or the irradiating intensity can be used to control the concentration of the macromolecular polymer in different regions.

In some embodiments, the polymer liquid crystal cell can include a light-scattering adjustment layer and a transparent substrate. The transparent substrate can be a glass substrate, a plastic substrate, or any other suitable transparent substrate. The light-scattering adjustment layer and the transparent substrate can have different refractive indexed. In some specific embodiments, the refractive index of the light-scattering adjustment layer can be larger than the refractive index of the transparent substrate.

In some embodiments, the polymer liquid crystal cell can increase the light transmittance, and can arrange partial liquid crystal molecules to be in a scattering state in response to an electrical signal. Therefore, the magnitude of the incident angle of the light propagating in the polymer liquid crystal cell can be changed, and the total reflection condition for the incident light can be destroyed. As such, without using a polarizer, the light can be emitted from desired positions to realize the display function. Therefore, the light transmittance can be increased and the light utilization efficiency can be improved.

Further, in some embodiments, the light-scattering ability of the display device can be designed according to distances from different portions of the display device to the light source. A portion of the display device has a larger distance from the light source area, the portion of the display device may demonstrate a stronger light-scattering ability. That is, the angle of the incident light may be more easily changed, and thus the total reflection condition may be more easily destroy. As such, the uneven display problem caused by the light attenuation can he compensated to improve the display uniform performance of the display device.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Further, the words "first", "second" and the like used in this disclosure do not denote any order, quantity or importance, but are merely intended to distinguish between different constituents. The words "comprise" or "include" and the like mean that the elements or objects preceding the word can cover the elements or objects listed after the word and their equivalents, without excluding other elements or objects. The words "connect" or "link" and the like are not limited to physical or mechanical connections, but may include electrical connections, either directly or indirectly. The words "above", "below", "left", "right" and the like are used only to represent the relative positional relationship, and the relative positional relationship may be changed accordingly when the absolute position of the corresponding object changes.

It also should be noted that, when an element, such as a layer, a film, a region, or a substrate, etc., is referred to as being "on" another element, the element may be "directly" on the other element, or there may be an intermediate element.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A display device, comprising:
   a polymer liquid crystal cell, including a first electrode layer, a second electrode layer, and a light-scattering adjustment layer between the first electrode layer and the second electrode layer; and
   a light source, arranged on a first side of the polymer liquid crystal cell and configured to emit light into the light-scattering adjustment layer, wherein:
      the first electrode layer includes at least one first electrode;
      the second electrode layer includes at least one second electrode; and
      a display region of the polymer liquid crystal cell includes a plurality of regions having a light-scattering ability increase along a direction away from the light source;
      an area of at least one of the first electrode gradually increases along the direction away from the light source.

2. The display device of claim 1, wherein:
the first electrode layer includes a plurality of first electrodes, arranged along the direction away from the light source with adjacent first electrodes spaced apart from one another.

3. The display device of claim 2, wherein:
the second electrode layer includes a plurality of second electrodes; and
the plurality of second electrodes are block-shaped electrodes and arranged into an array.

4. The display device of claim 3, wherein:
the first electrode corresponds to at least one second electrode.

5. The display device of claim 3, wherein:
the plurality of first electrodes are common electrodes; and
the plurality of second electrodes are pixel electrodes.

6. The display device of claim 1, wherein:
the plurality of regions of the polymer liquid crystal cell have a substantially identical size; and
each region includes at least one first electrode.

7. The display device of claim 6, wherein:
the plurality of first electrodes are made of a same material.

8. The display device of claim 1, wherein:
each first electrode has a rectangular shape;
a length of the first electrode remains constant; and
a width of the first electrode gradually increases along the direction away from the light source.

9. The display device of claim 1, wherein:
the plurality of first electrodes have substantially identical dimensions;
a plurality of hollow holes are formed in each first electrode; and
a total area of the hollow holes in the first electrode gradually decreases along the direction away from the light source.

10. The display device of claim 9, wherein:
the plurality of hollow holes are substantially evenly distributed and have a substantially same shape.

11. The display device of claim 9, wherein:
each region of the polymer liquid crystal cell includes a plurality of pixels; and
each hollow hole has an area less than an area of a single pixel.

12. The display device of claim 9, wherein:
each region of the polymer liquid crystal cell includes a plurality of pixels; and
a number of the hollow holes in each region of the polymer liquid crystal cell is less than 10% of a number of pixels in the region.

13. The display device of claim 1, wherein:
the light-scattering adjustment layer is made of polymer-stabilized liquid crystals (PSLCs), formed from a macromolecular polymer and liquid crystals.

14. The display device of claim 13, wherein:
along the direction away from the light source, a concentration of macromolecular polymer in the region of the polymer liquid crystal cell gradually increases.

15. The display device of any one of claims 13, wherein:
the macromolecular polymer includes at least one of:
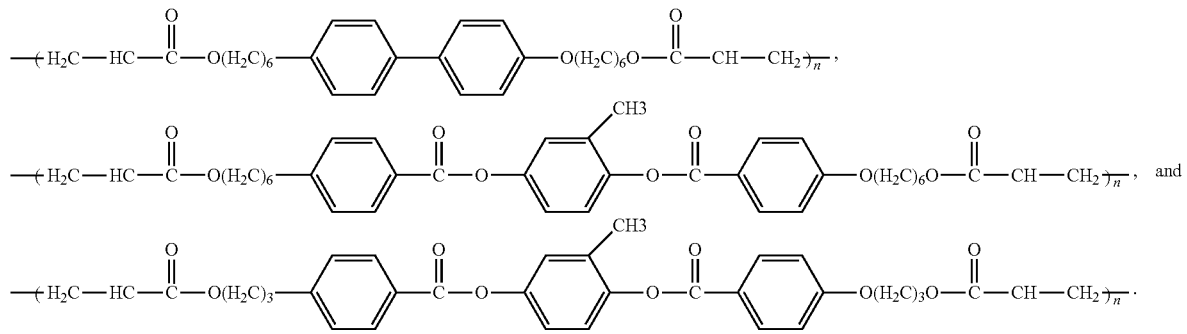
16. The display device of claim 1, further comprising:
a reflector on a second side of the polymer liquid crystal cell that is opposite to the light source.
* * * * *